(12) United States Patent
Munn

(10) Patent No.: US 8,038,889 B2
(45) Date of Patent: Oct. 18, 2011

(54) CLEANING DEVICE

(75) Inventor: Samuel Munn, Swansea (GB)

(73) Assignee: Samatrix Limited, Swansea (GB)

( * ) Notice: Subject to any disclaimer, the term of this patent is extended or adjusted under 35 U.S.C. 154(b) by 244 days.

(21) Appl. No.: 12/528,892

(22) PCT Filed: Feb. 27, 2008

(86) PCT No.: PCT/GB2008/000664
§ 371 (c)(1),
(2), (4) Date: Sep. 11, 2009

(87) PCT Pub. No.: WO2008/104773
PCT Pub. Date: Sep. 4, 2008

(65) Prior Publication Data
US 2010/0084348 A1 Apr. 8, 2010

(30) Foreign Application Priority Data

Feb. 27, 2007 (GB) .................................. 0703823.5
Mar. 8, 2007 (GB) .................................. 0704557.8

(51) Int. Cl.
*E03F 5/14* (2006.01)
(52) U.S. Cl. .................. 210/744; 210/747.2; 210/791; 210/106; 210/121; 210/156; 210/159; 210/162; 210/170.03; 210/413; 15/236.08; 137/101.27

(58) Field of Classification Search .................. 210/744, 210/747.2, 747.5, 791, 106, 121, 137, 143, 210/156, 159, 162, 170.03, 170.1, 242.1, 210/413; 15/236.08; 56/8, 400.04; 137/101.27
See application file for complete search history.

(56) References Cited

U.S. PATENT DOCUMENTS

| 1,331,935 A | * | 2/1920 | Lee ................................ 210/156 |
| 1,551,967 A | * | 9/1925 | Nample ........................ 210/156 |
| 1,651,321 A |   | 11/1927 | Burkelman |
| 3,477,579 A | * | 11/1969 | Turner .......................... 210/156 |
| 3,567,032 A | * | 3/1971 | Kemper ........................ 210/413 |
| 4,214,988 A | * | 7/1980 | Naffziger ...................... 210/159 |

(Continued)

FOREIGN PATENT DOCUMENTS

CH  689426 A5  4/1999

(Continued)

*Primary Examiner* — Christopher Upton
(74) *Attorney, Agent, or Firm* — Gifford, Krass, Sprinkle, Anderson & Citkowski, P.C.

(57) ABSTRACT

A screen cleaning apparatus for use, for example, in connection with a discharge conduit of a sewage pumping station, may include a housing, a screen, a rake and a float. The housing may operate to contain a fluid (and/or define a container for the other components) and include a fluid inlet and a fluid outlet. The screen may be positioned in the housing and define one or more apertures. The rake may also be positioned in the housing and have one or more protrusions, with each protrusion extending into a respective aperture in the screen. The float may apply a force to the rake so that the rake moves relative to the screen and in dependence upon variations of a volume of fluid received in the housing. Accordingly, the rake may rise and fall will the fluid level to remove debris from the screen.

19 Claims, 14 Drawing Sheets

U.S. PATENT DOCUMENTS

| | | | | | |
|---|---|---|---|---|---|
| 4,642,195 | A | * | 2/1987 | Nill | 210/159 |
| 5,079,905 | A | * | 1/1992 | Bergstrom | 56/8 |
| 5,164,079 | A | * | 11/1992 | Klein | 210/411 |
| 5,902,477 | A | * | 5/1999 | Vena | 210/162 |
| 5,937,473 | A | * | 8/1999 | Lisowski | 15/236.08 |
| 6,132,626 | A | * | 10/2000 | Hart | 210/744 |

FOREIGN PATENT DOCUMENTS

| | | |
|---|---|---|
| EP | 0672800 A2 | 9/1995 |
| GB | 2367015 A | 3/2002 |
| GB | 2397538 A | 7/2004 |

* cited by examiner

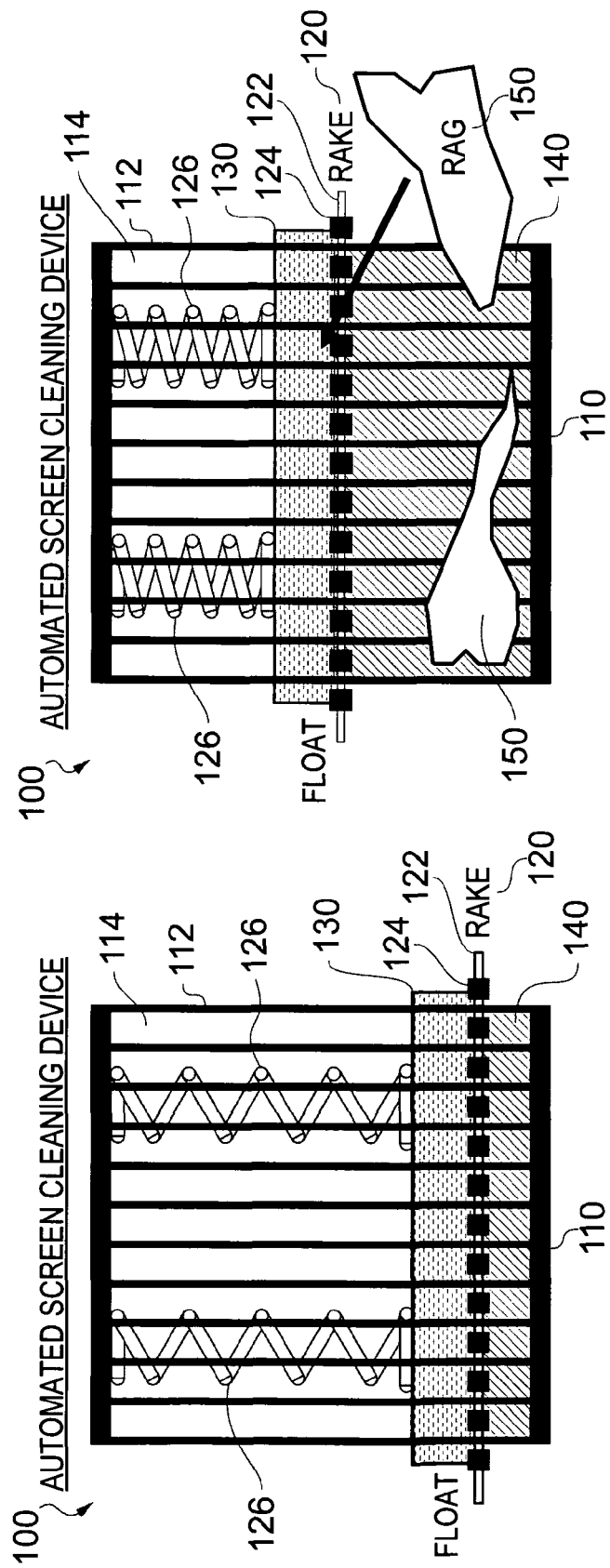

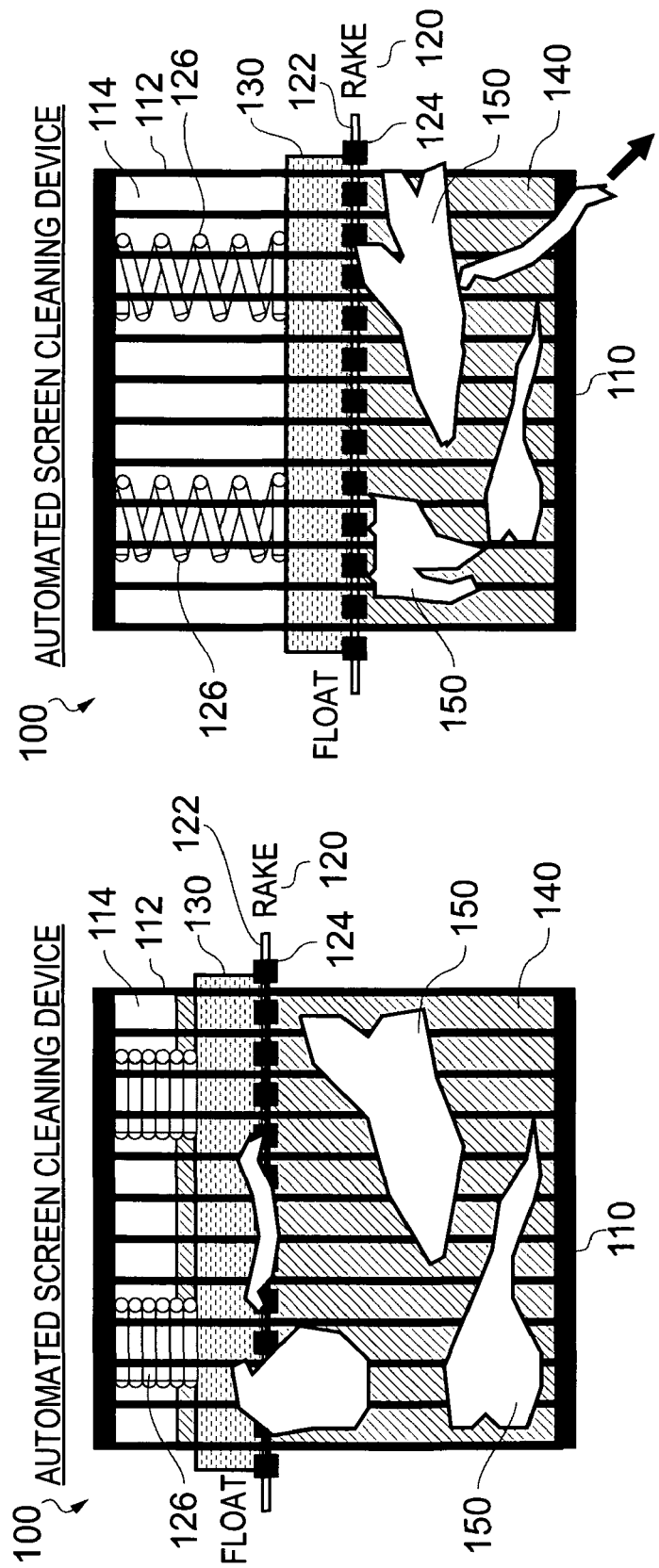

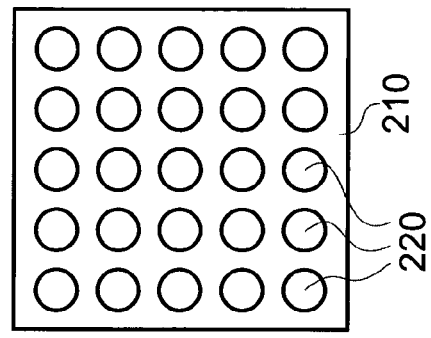
FIG. 13
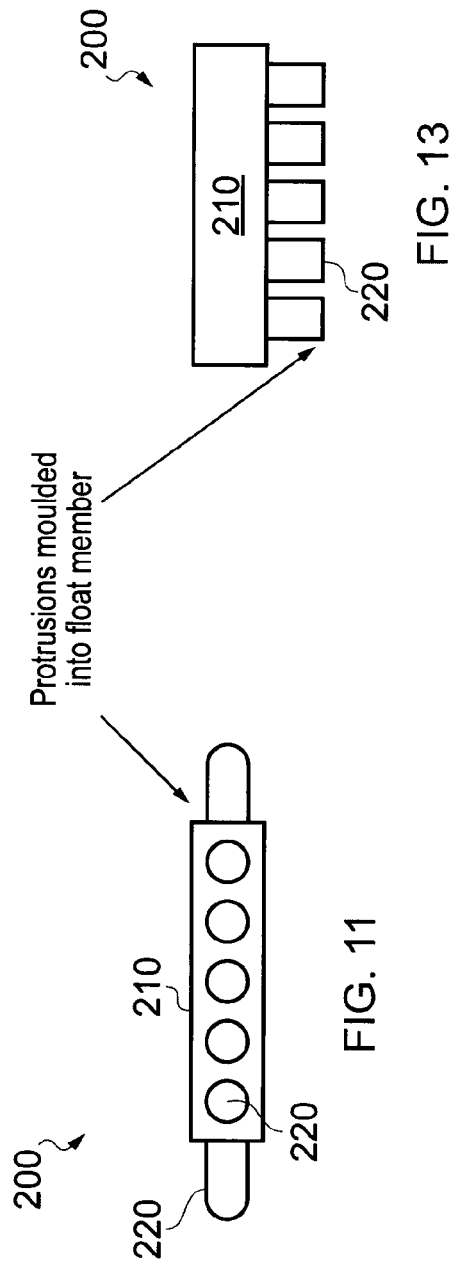
Protrusions moulded into float member
FIG. 11
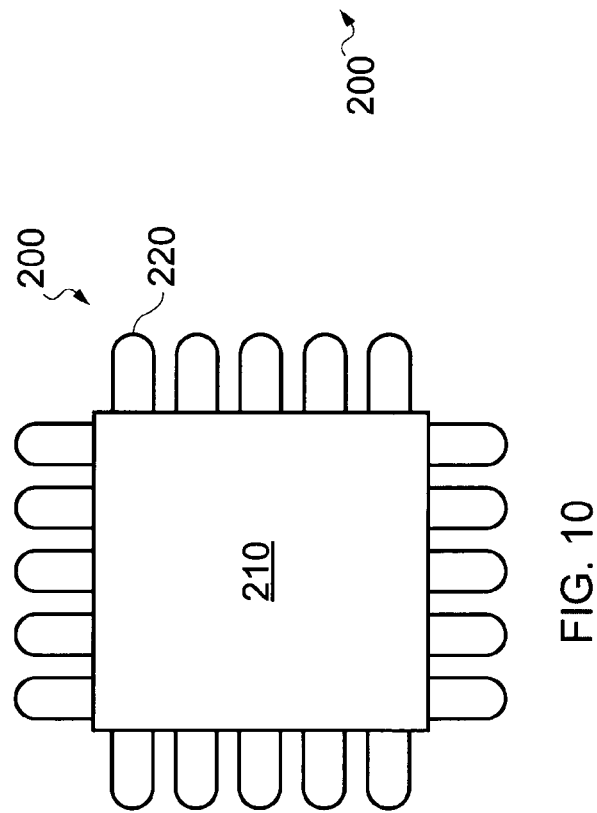
FIG. 12
FIG. 10

CLEANING DEVICE

CROSS-REFERENCE TO RELATED APPLICATIONS

This application is the U.S. national phase of PCT/GB2008/000664 filed Feb. 27, 2008, which claims priority of Great Britain Patent Application 0703823.5 filed Feb. 27, 2007 and Great Britain Patent Application 0704557.8 filed Mar. 8, 2007.

BACKGROUND TO THE INVENTION

The present invention relates to an automatic screen-cleaning apparatus. In particular, the present invention relates to an automatic screen cleaning apparatus for use as part of a sewage pumping station or the like.

Sewage pumping stations are conventionally underground structures that foul or surface water sewage is discharged into. There are various types of sewage stations, but in smaller systems the sewage station is typically a wet well i.e. where the pumping station houses one or more submersible pumps which pump the sewage onwards to its next destination. In a larger station there may be a separate dry well, adjacent to the wet well, which houses the pumps. Alternatively, on some pumping stations the pumps may be housed above ground near the wet well.

In storm conditions or other extreme circumstances which would be sufficient to flood the pumping station with sewage in volumes which exceed the intended capacity of the sewage pumping station, many pumping stations have consent to discharge sewage in a controlled manner into a nearby river or stream. Such consent is issued by the Environmental Agency in an effort to avoid a breach of raw sewage at ground level where the pumping station is situated. In the event of such an extreme situation arising, sewage is discharged from the pumping station via an outfall' into a nearby river or stream.

The most common causes of flooding of pumping stations include heavy rainfall, electrical power failure, for example caused by power-cuts, mechanical breakdown of pumps, and downstream blockage of the sewage transit pipe system.

Most pumping stations are required to filter the sewage to prevent larger particles of sewage solids or Rag being discharged. Rag is the generic name for any non-organic material that is present in the sewage liquid and includes materials such as toilet tissue, old dish cloths and other fabric materials, and other items that may be found floating on the top of the sewage surface.

If the screen becomes blocked, less filtered sewage is discharged and thus, if more sewage is entering the pumping station that is able to be discharged through the blocked or partially blocked screen, the sewage level at the pumping station rises and eventually the sewage will breach the ground surface, rather than being safely discharged into a nearby river or stream. As some pumping stations are located in residential areas, this is both unhygienic and undesirable.

One prior art solution that attempts to address this problem involves a high pressure jet arrangement located so as to spray the residue or rag off the screen in a cleaning action, thereby keeping the screen in an unblocked state. Such systems may be automated when used in combination with a sonar device, but have expensive installation and operating costs. For most pumping stations the cost of automated screen cleaning is not economical, and so the screen is cleaned manually using a rake or a mobile pressure washer when an operator visits the site. The manual cleaning is normally triggered after a storm event, but this operation is often missed and the screen remains at least partially blocked.

There is therefore a need for a low cost way to facilitate efficient automated screen cleaning.

SUMMARY OF THE INVENTION

The present invention seeks to address the problems of the prior art.

Accordingly, a first aspect of the present invention provides an automatic screen cleaning apparatus comprising:
  a. a housing for containing a liquid, the housing provided with a liquid inlet, a liquid outlet and a screen member;
  b. the screen member defining at least one aperture therethrough;
  c. a rake member received within the housing and having one or more protrusions, the or each protrusion extending into a respective aperture defined by the screen member;
  d. a resilient member arranged so as to apply a first force to a first surface of the rake member; and
  e. a float member adapted to apply a second opposing force to the rake member.
  such that the rake member is moveable relative to the screen member in dependence upon variations in the volume of liquid received within the housing.

Thus, when sewage enters the housing, the rake member rises with the rising surface level of the sewage due to the presence of the float member. This causes the protrusions of the rake member to rise upwards within the respective apertures.

The screen member may comprise a plurality of elongate spacers each pair of elongate spacers defining a gap therebetween. Alternatively, the screen member may comprise a substantially planar member defining a plurality of apertures therethrough.

The dimensions of the apertures in the screen member determine the size of rag that is prevented from passing into the housing.

The float member may be located above or below the rake member and may comprise any suitable buoyant member and may comprise and suitable material known to the skilled person including, but not restricted to, for example, moulded plastic air-filled floats, polyurethane foam filled buoyancy devices and the like.

Preferably, a greater force is applied to the second surface of the rake member than to the first surface of the rake member.

As the liquid level rises, the buoyancy forces exert an upwards pressure on and through the float member to the rake member to overcome the resilient member, thus allowing the rake member to rise with the sewage surface level against the force applied by the resilient member.

The resilient member may comprise any resilient arrangement known to the skilled person and suitable for the purpose. For example, the resilient member may comprise a spring, or a resiliently compressible member or a resilient plunger arrangement or a resiliently bendable rod arrangement or the like.

The protrusions of the rake member may comprise any suitable protrusions known to the skilled person, including but not limited to prongs, teeth, bars and rods. For example, where the screen member comprises a substantially planar member defining a plurality of apertures therethrough, the protrusions may comprise rods with a cross-sectional shape corresponding to the shape of the apertures and dimensioned to fit closely within the apertures.

When the sewage surface level drops, the rake member lowers by a corresponding amount as the float member will continue to allow movement of the rake member with the sewage surface level. However, by application of force to a first surface of the rake member by the resilient member, the rake member is able to dislodge any adhered rag from the screen in a scraping or pushing action and move downwards whilst remaining at the sewage surface level. The dislodged rag is then either returned to the surface of the sewage or is dislodged so as to fall outside of the screen and returns to float in the wet well. At the normal operating range (start/stop levels) the pumps may draw the rag in under suction and pass it forward. Otherwise, the rag will be removed by tanker during the scheduled well clean.

Thus, the rake member position is determined by the balance of forces acting at the first and second opposing surfaces of the rake member.

The movement of the rake member relative to the screen member results in relative movement of the or each protrusion relative to the respective aperture into which it extends.

The or each protrusion may be dimensioned to correspond substantially with the width of the respective elongate gap through which it extends. In this way, the protrusions can effectively dislodge even small pieces of rag which have adhered to the screen.

An automatic screen cleaning apparatus in accordance with the present invention may comprise a plurality of rake members.

In one embodiment, the rake member may be integral with the float member. For example, the float member may define the rake member protrusions. One way in which this may be realised is by casting or moulding the rake protrusions integrally with the float member as a single integral unit.

A second aspect of the present invention provides an automatic screen cleaning apparatus comprising:
  a. a housing for containing a liquid, the housing provided with a liquid inlet, a liquid outlet and a screen member;
  b. the screen member defining at least one aperture therethrough;
  c. An orifice plate defining an orifice in fluid communication with the liquid outlet of the housing;
  d. A float member received within the housing, the float member comprising a rake member having one or more protrusions, the or each protrusion aligned with a respective aperture defined by the screen member,
wherein the float member is moveable relative to the screen member in dependence upon variations in the volume of liquid received within the housing such that the float member obstructs the orifice of the orifice member to varying amounts in dependence upon the position of the float member within the housing.

Preferably, the orifice of the orifice plate comprises an orifice of increasing diameter in a direction extending away from the screen member. For example, the orifice may have a "Y" shaped aperture. However, it will be appreciated that any other suitable shape may be used, such as, but not limited to, a "V"-shaped orifice or a "U" shaped orifice or the like.

The total area of the apertures defined by the screen member is preferably greater than the area of outlet 50 to allow for partial blocking of the apertures without affecting fluid flow through the housing.

The total area of the orifice is preferably substantially the same as the area of the liquid outlet. If the area of the orifice is less than that of the liquid outlet, fluid flow through the housing may be detrimentally restricted.

A further aspect of the present invention provides a method of automatically cleaning a screen, the method comprising the steps of:
  a. providing an automatic screen cleaning apparatus as described herin; and
  b. passing liquid through the inlet in the housing so as to vary the volume of liquid received within the housing.

A further aspect of the present invention provides a sewage pumping station comprising an automatic screen cleaning apparatus in accordance with a first aspect of the present invention.

A further aspect of the present invention provides a rake member for automatic cleaning of a screen of a pumping station, the rake member comprising one or more protrusions, the or each protrusion adapted for location within an aperture defined by the screen, a resilient member arranged to apply a first force to the rake member and a float member located so as to apply a second opposing force to the rake member.

BRIEF DESCRIPTION OF THE DRAWINGS

Embodiments of the invention will now be described, by way of example only, and with reference to the accompanying drawings, in which:

FIG. 2 is a cross-sectional view of a first embodiment of the screen arrangement of FIG. 1;

FIG. 3 is a cross-sectional view of the screen arrangement of FIG. 2 with an increased volume of sewage received within the housing of the automatic screen cleaning apparatus relative to FIG. 2;

FIG. 4 is a cross-sectional view of the screen arrangement of FIG. 2 with the rake member shown at its highest point;

FIG. 5 is a cross-sectional view of the screen arrangement of FIG. 2 with a decreased volume of sewage received within the housing of the automatic screen cleaning apparatus relative to FIG. 4, and showing rag dislodged from the screen;

FIG. 10 is a plan view of an embodiment of a single unit integral screen member/rake member arrangement;

FIG. 11 is a side view of the single unit of FIG. 10;

FIG. 12 is a plan view of further embodiment of a single unit integral screen member/rake member arrangement;

FIG. 13 is a side view of the single unit of FIG. 12.

DETAILED DESCRIPTION OF THE INVENTION

An embodiment of the present invention will now be described with reference to all of FIGS. 1 to 20, in which common features are indicated using common figure references.

Figure 1:
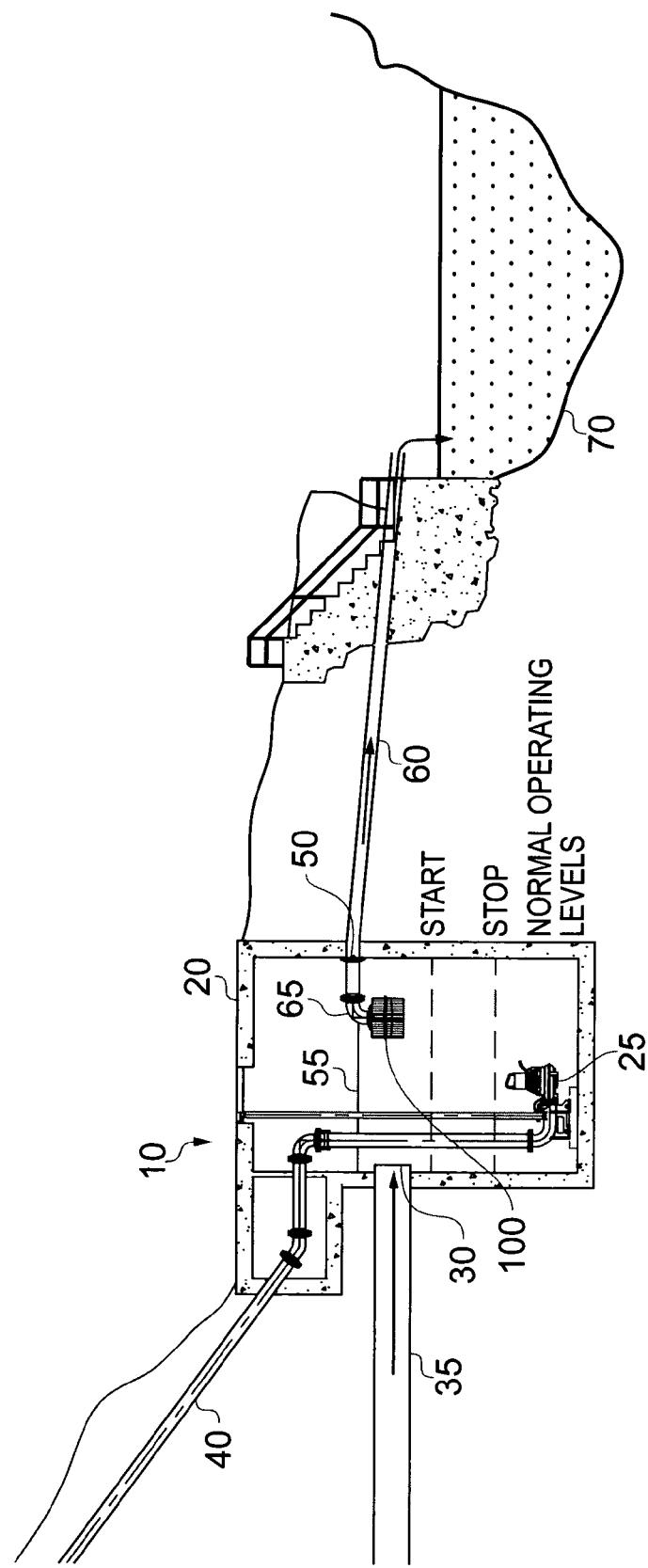
FIG. 1 is a side view of a pumping station comprising an embodiment of an automatic screen cleaning apparatus in accordance with a first aspect of the present invention.
Figure 6:
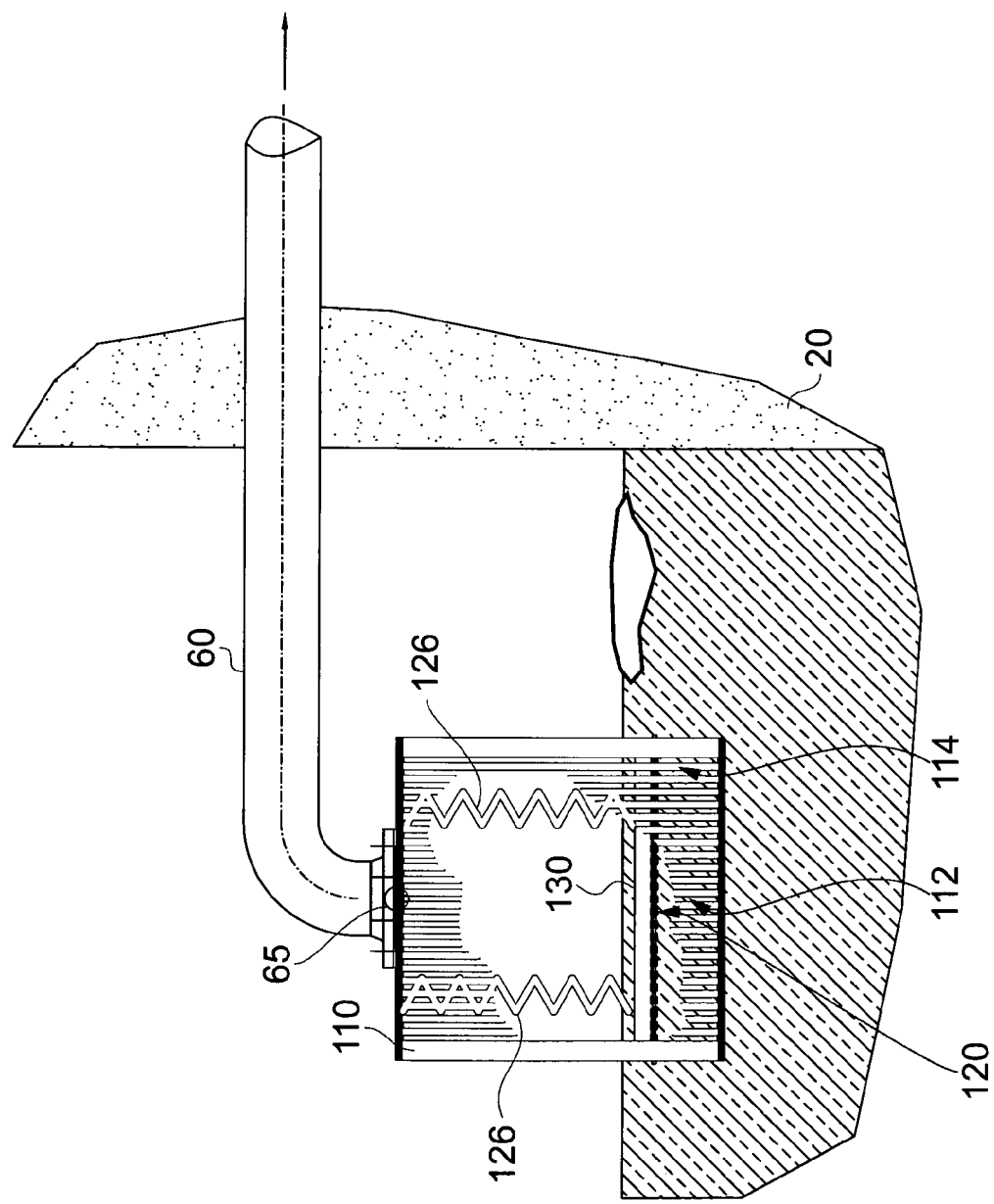
FIG. 6 is a cross-sectional view of the screen arrangement of FIG. 2 and overflow with the rake member at a low position.
Figure 7:
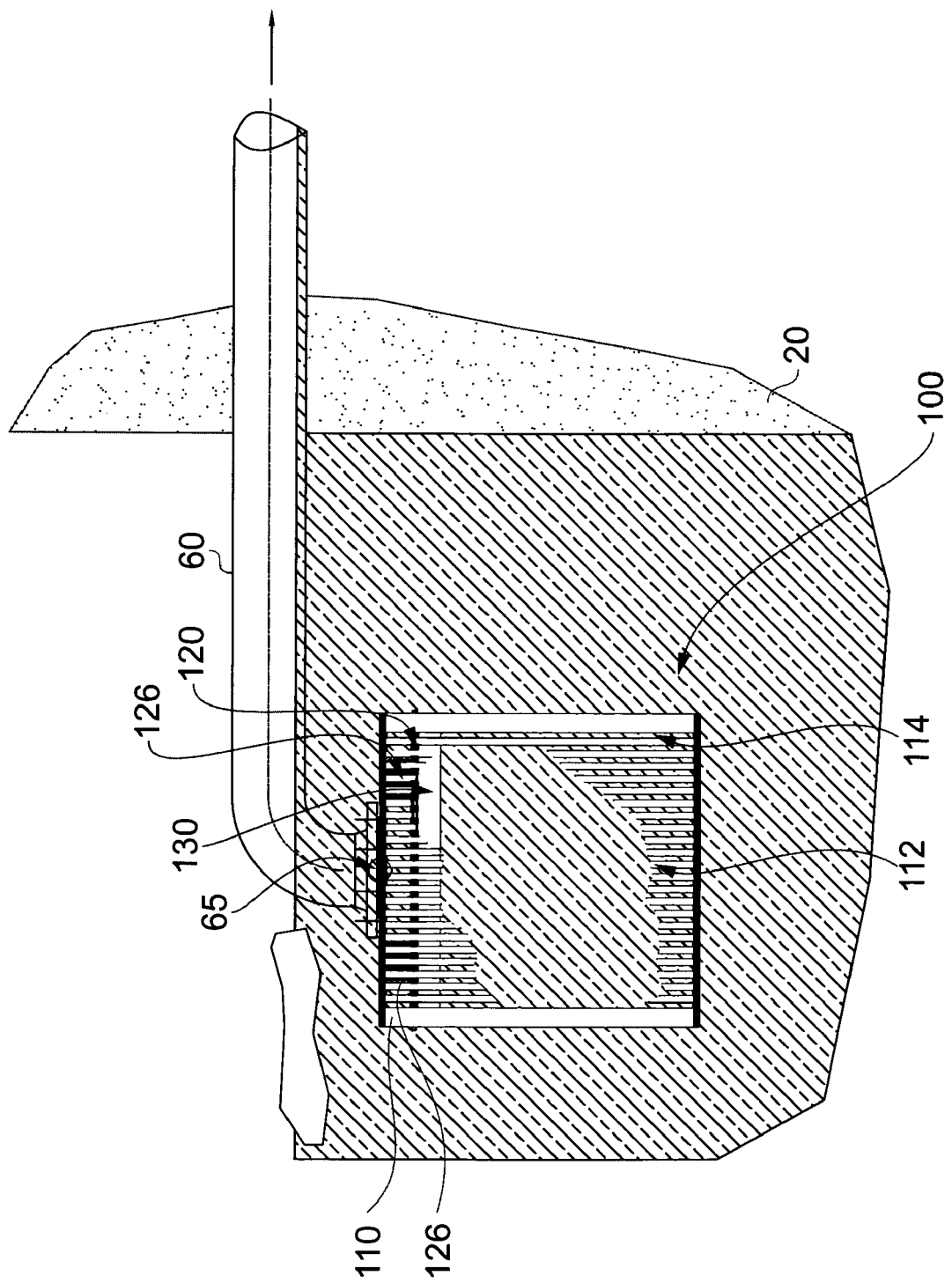
FIG. 7 is a cross-sectional view of the screen arrangement of FIG. 2 and overflow with the rake member at a high position.

FIG. 1 shows a pumping station 10 comprising a housing 20 containing a pump 25, the housing 20 having a sewage inlet 30, through which sewage is received from sewage inlet pipe 35, and a sewage outlet 40 through which sewage is pumped for onward travel. The housing is also provided with an outfall outlet 50 through which sewage may leave the housing 20 when the sewage level within the housing 20 exceeds overflow level 55.

Sewage leaving housing 20 through outfall outlet 50 passes through outfall pipe 60 and finally exits outfall pipe 60 at a nearby river or stream 70.

A screen cleaning apparatus 100 is located within housing 20 (shown in more detail in FIGS. 2 to 7) substantially adjacent the inlet 65 to outfall pipe 60. Screen cleaning apparatus 100 comprises a screen member 110 and a rake member 120. Rake member 120 comprises a body 122 with prongs 124 extending therefrom. A float member 130 is located adjacent rake member 120 and resilient members 126 in the form of springs are provided in engagement with float member 130 and the upper interior surface of screen cleaning apparatus 100. Screen member 110 has a number of elongate spacers 112 defining gaps 114 therebetween, with each prong of rake member 120 extending through a respective elongate gap 112 of screen member 110 to clear any potentially adhered rag.

In use, sewage 140 containing rag 150 is received into housing 20 of pumping station 10 through inlet 30 of sewage inlet pipe 35. Pump 25 then pumps the sewage 140 and rag 150 through sewage outlet 40 onward to its next destination. During the process, some rag may get drawn into the suction of the pump and passed forward under pressure to the next pumping station. However, the volume of sewage 140 received within housing 20 may vary depending on several influencing factors including, but not limited to, the flow of sewage 140 passing through sewage inlet pipe 35 and/or the efficiency/malfunctioning of pump 25. When the level of sewage 140 received within housing 20 rises above overflow level 55, sewage passes through screen cleaning apparatus 100 into outfall pipe 60 through outlet 50. However, as sewage 140 passes through screen member 110, rag 150 floating within sewage 140 may adhere or become lodged against spacers 112 of screen member 110. Sufficient adhesion/lodging of rag 150 in this manner may lead to full or partial blocking of gaps 114 in screen member 110, thereby preventing passage of sufficient volumes of sewage 140 through screen member 110 to prevent overflow of sewage from housing 20 leading to flooding of sewage 140 at ground level. Thus, it is important the screen member 110 is kept clear of obstructions at all times.

As the sewage surface level rises, rake member 120 moves rises with the sewage surface level due to the application of force exerted on rake member 120 by float member 130.

Once the sewage surface level drops, any pieces of rag which have become lodged within the gaps 114 defined by spacers 112 of screen member 110 are dislodged by the movement of prongs 124 downwards between gaps 114. The dislodged rag 150 is dislodged back into the volume of sewage contained within the housing 20 of pumping station 10. In this way, the gaps 114 between spacers 112 of screen member 110 are automatically kept free of obstruction, thereby avoiding the blockage of screen member 110 and the overflow of sewage from pumping station 10 at ground level. The size of the gaps in the screen limits the dimensions of the rag passing through to overflow.

Figure 9:
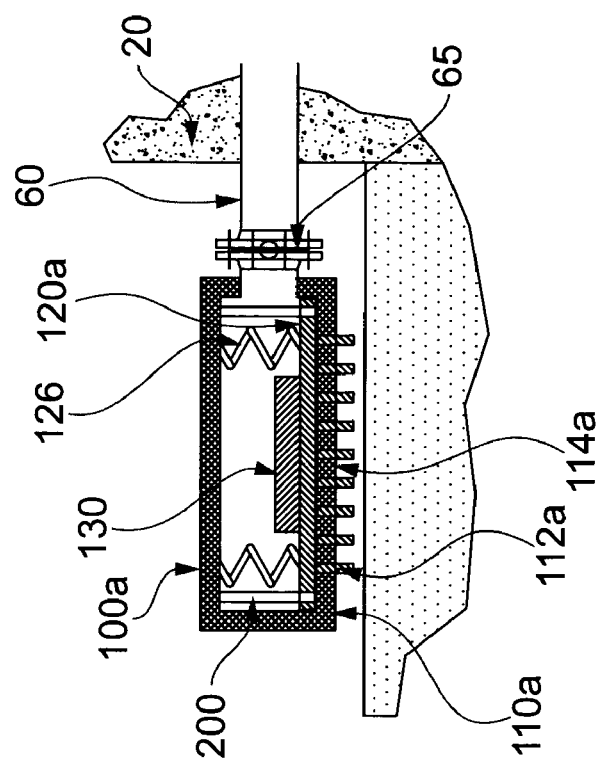
FIG. 9 is a cross-sectional view of the embodiment of FIG. 8 with the rake member at its lowest position.
Figure 8:
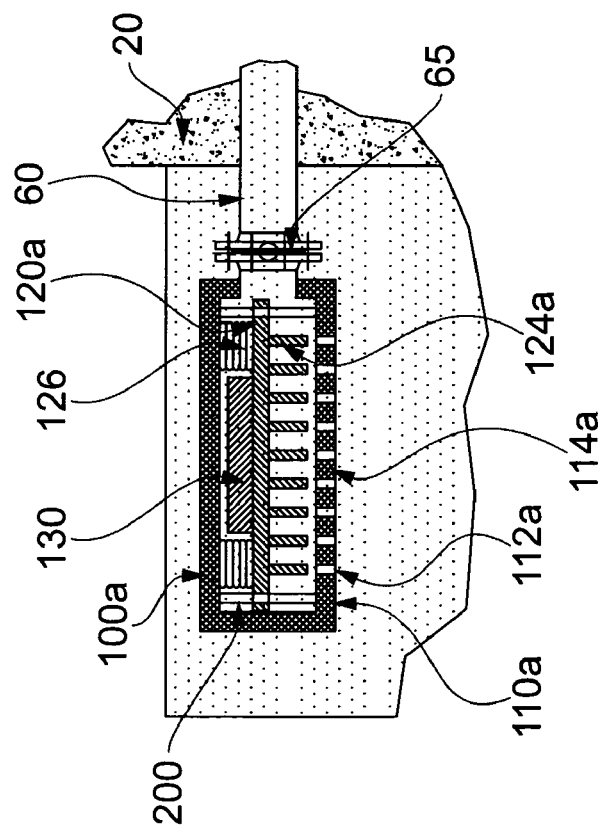
FIG. 8 is a cross-sectional view of a second embodiment of an automatic screen cleaning apparatus in accordance with a first aspect of the present invention with the rake member shown at its highest position.

FIGS. 8 and 9 show a further embodiment of an automatic screen cleaning apparatus in accordance with a first aspect of the present invention.

Screen cleaning apparatus 100A of FIGS. 8 and 9 closely resembles apparatus 100 of FIGS. 1 to 7. However, screen member 110A comprises a substantially planar member 114A defining a plurality of apertures 112A therethrough with 6 mm diameters.

Rake member 120A comprises a plurality of rods 124A dimensioned so as to fit through respective apertures 112A in screen member 110A.

Support rods 200 are provided to keep the rods 124A of rake member 120A aligned with respective apertures 112A in screen member 110A.

When the rake member 120A is in a raised position (see FIG. 8), rods 124A clear respective apertures 112A in screen member 110A thereby allowing fluid to flow through apertures 112A into screen cleaning apparatus 100A and out through outfall pipe 60.

However, when rake member 120A is in a lowered position, rods 124A of rake member 120A extend through respective apertures 112A, thereby blocking the passage of fluid into apparatus 100A.

Due to the dimensions of the apertures 112A, there is a limitation on the size of rag that is able to pass through apertures 112A into apparatus 100A when rake member 120A is in a raised position. Typically, the apertures 112A will be dimensioned to prevent rag sized greater than 6 mm from passing through into apparatus 100A. However, other dimensions may be applied to the apertures 120A as required.

Blockage of apertures 112A in screen member 110A is prevented as any lodged rag is dislodged by the movement of rods 124A through respective apertures 112A.

It will be appreciated that the dimensions and shape of apertures 112A may be varied as desired in order to control the dimensions of rag which are prevented from passing through apertures 112A into apparatus 100A.

It will be appreciated that the screen member and float member may be provided integrally, as shown in FIGS. 10 and 11. Integral screen/float member 200 comprises a body 210 defining protrusions 220 extending from the body 210. Body 210 of FIGS. 10 and 11 is equivalent to float member 130 of FIGS. 2 to 5, and protrusions 220 are equivalent to prongs 124 of rake member 120 of FIGS. 2 to 5.

A second embodiment of such a single unit screen member/float member arrangement is shown in FIGS. 12 and 13 in which integral screen/float member 200 comprises a body 210 defining protrusions 220 extending from the body 210. Body 210 of FIGS. 12 and 13 is equivalent to float member 130 of FIGS. 8 and 9 and protrusions 220 of FIGS. 12 and 13 are equivalent to prongs 124A of rake member 110A of FIGS. 8 and 9.

An integral screen member/float member arrangement may comprise a one piece moulding, or the body (i.e. float member portion) may have protrusions cast into it. Alternatively, any other suitable means of manufacture known to the skilled person may be employed. For example, the body and protrusions may be manufactured separately and engaged with one another prior to installation within a screen cleaning apparatus in accordance with the present invention.

A further embodiment of an automatic screen cleaning device in accordance with a second aspect of the present invention is shown in FIGS. 14 to 20 in which screen cleaning device 100b is located within housing 20. A "Y" notch orifice plate 80 located at the output of screen cleaning device 100b such that it is substantially adjacent the inlet end of outfall outlet 50. Screen cleaning device 100b further comprises a screen member 110b defining a plurality of spaced apertures 112b, a float 130b located above the screen member 110b with rods 124b extending from float 130b towards screen 110b and aligned with apertures 112b.

Figure 15:
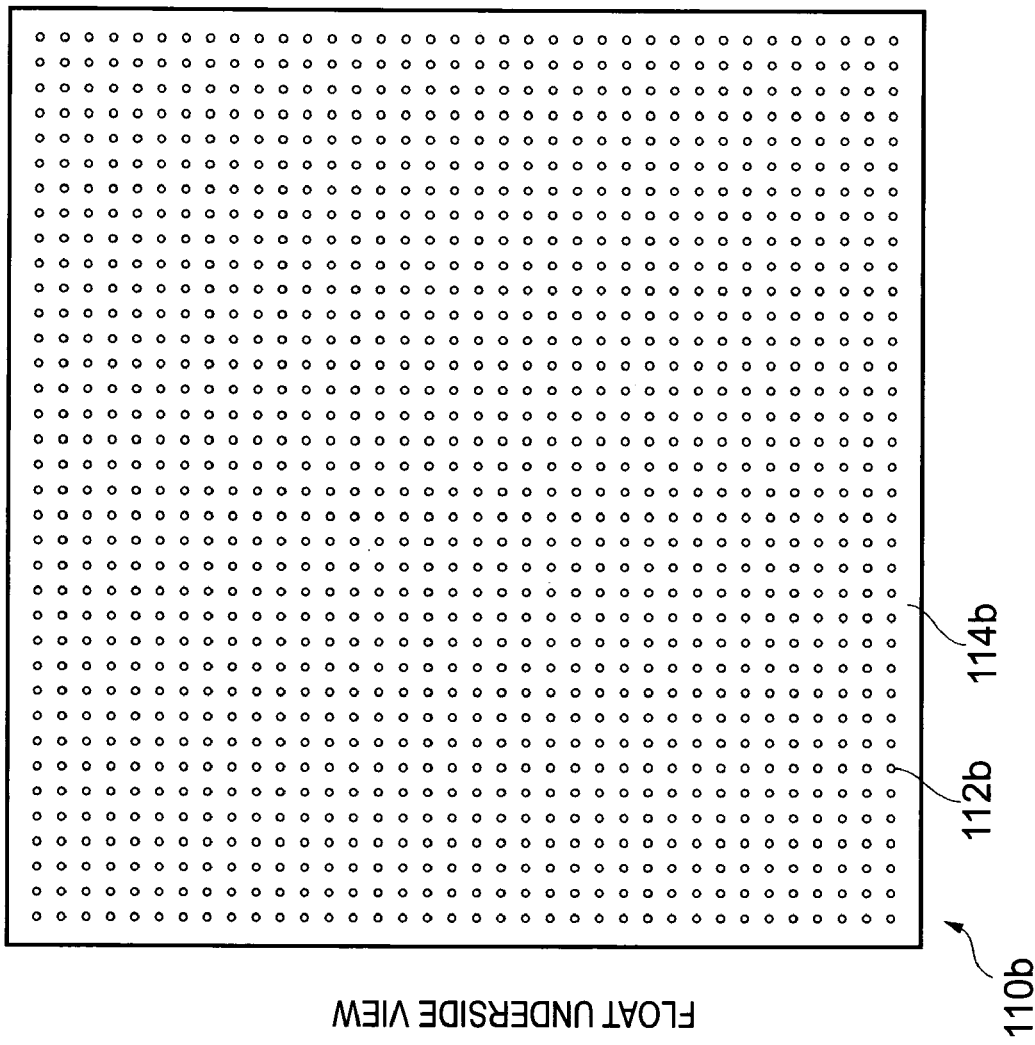
FIG. 15 is a plan view of the screen of the screen cleaning device of FIG. 14.
Figure 16:
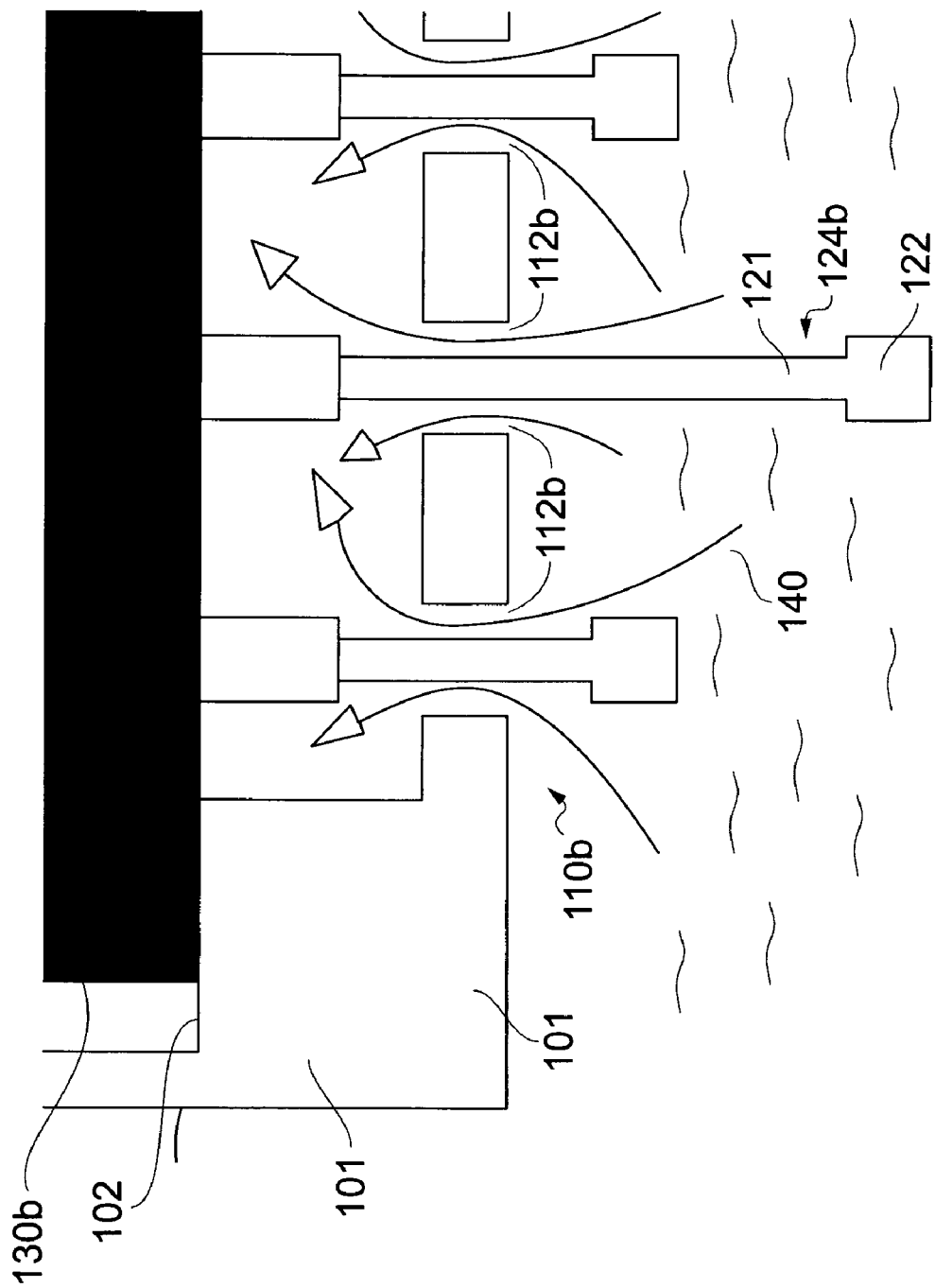
FIG. 16 is an enlarged view of a portion of FIG. 14 showing the detail of the screen cleaning rods and their interaction with the screen.

FIG. 15 shows a plan view of screen 110b. Screen 110b comprises a substantially planar member 114b defining a plurality of apertures 112b. Apertures 112b preferably have a diameter of substantially 6 mm. It will be appreciated however that the cross-sectional shape and dimensions of apertures 112b may be varied depending on the dimensions of rods 124b and/or composition of rag 150 in order control the dimensions of rag that will be able to pass through screen 110b.

Effluent 140 flows through apertures 112b, which are partially obstructed by shank 121 of the rod 124b, across the top of screen 110b, through the narrow portion 83 of "Y" notch orifice plate 80, and through the outfall outlet 50.

Figure 14:
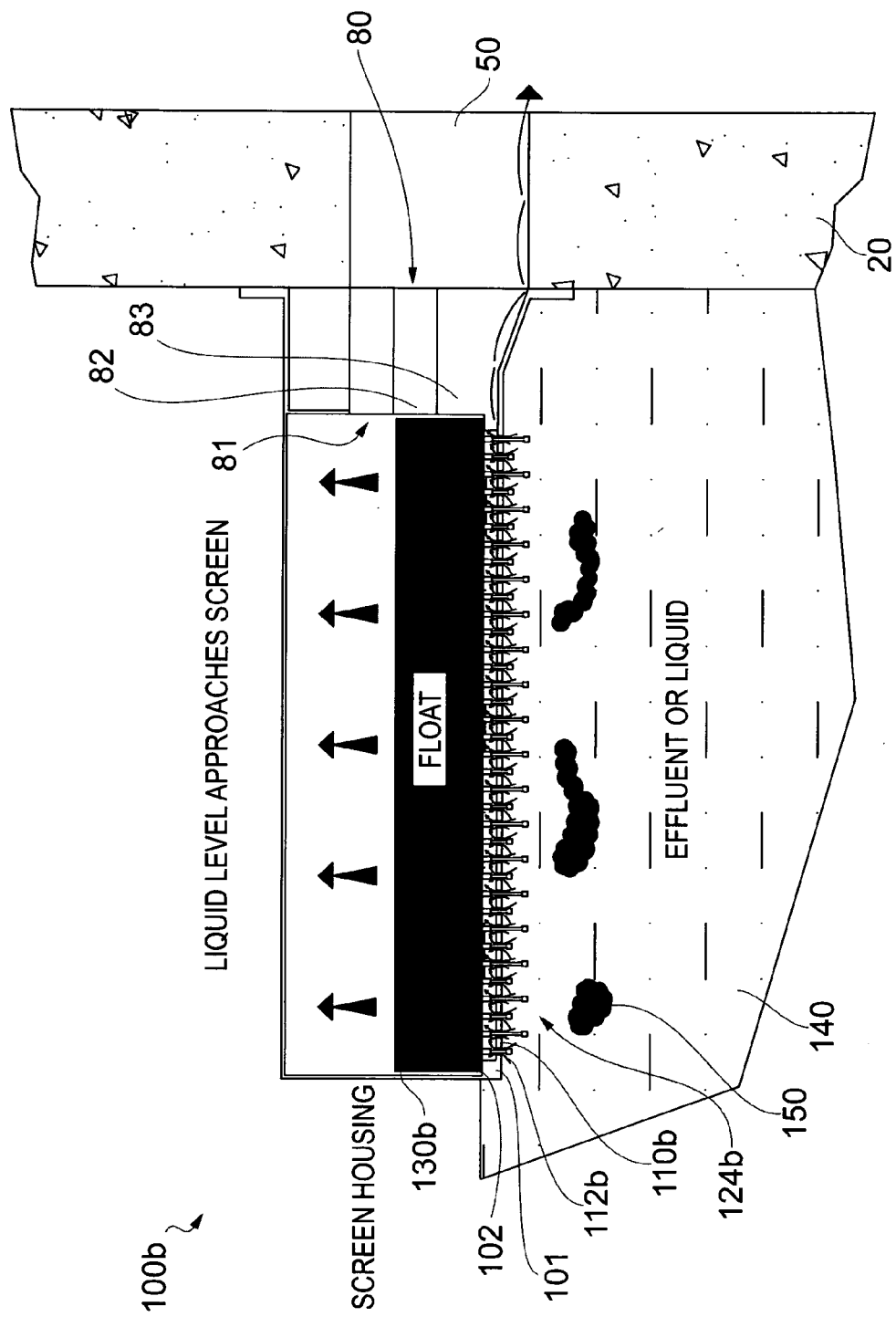
FIG. 14 is a cross-sectional view of a first embodiment of an automatic screen cleaning device in accordance with a second aspect of the present invention with the float in the lowest position.

FIG. 14 shows a cross-sectional view of the screen cleaning device 100b in the closed position. (See FIG. 16 for enlarged view of a portion of FIG. 14) The closed position is defined as the float 130b resting on seat 101 and occurs when the level of effluent 140 is lower than the upper surface 102 of seat 101. FIG. 14 shows the level of effluent 140 being above the level of the screen 110b and below the level of upper surface 102 of seat 101.

Figure 17:
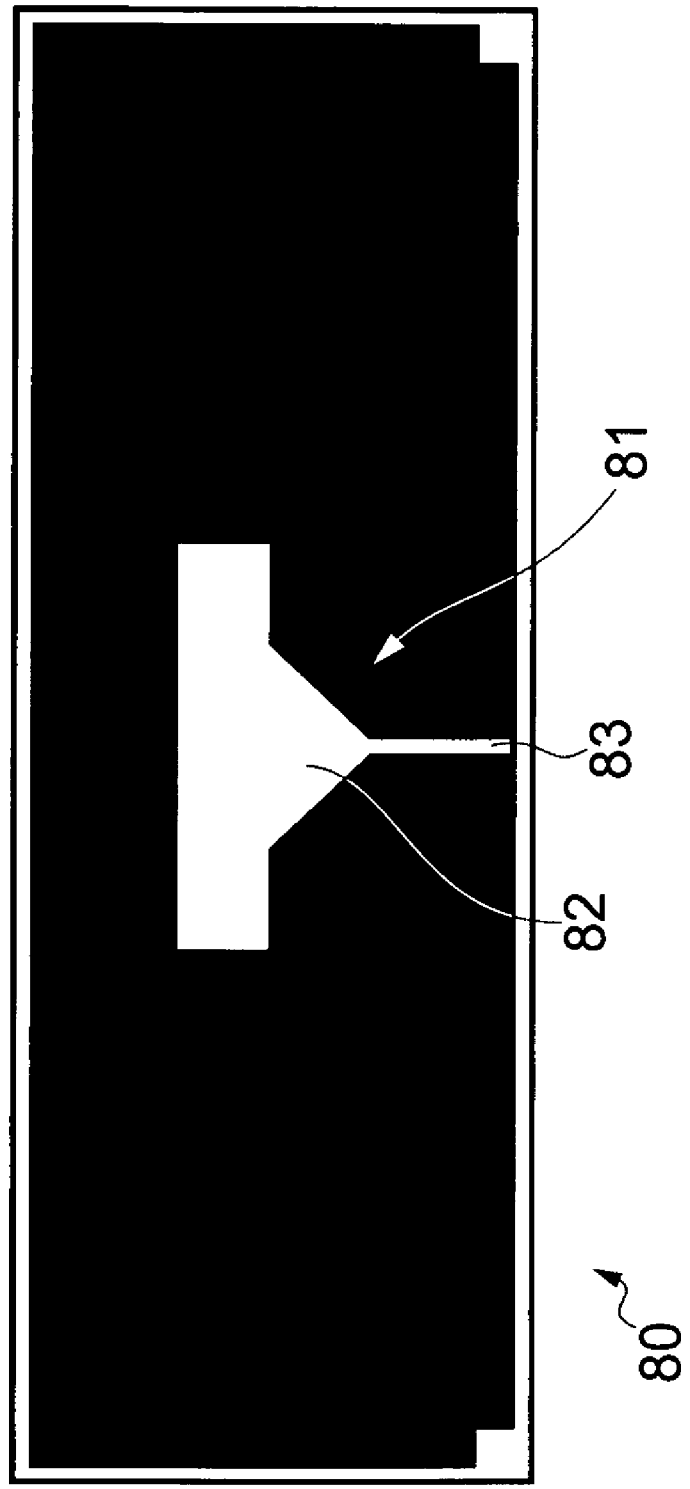
FIG. 17 is a cross-sectional view of the "Y" notch orifice plate.

FIG. 17 shows an end view of "Y" notch orifice plate 80. The total area of the apertures 112b is significantly greater than the area of outlet 50 in order to permit sufficient fluid flow through apparatus 100b even when there is partial blockage of apertures 112b. For example, the total area of the "Y" notch orifice 81 may be around one quarter of the sum of the areas of apertures 112b. It will be appreciated that other orifice shapes may be used such as but not limited to a "V" or "Y" shape. A feature of the orifice is that it comprises a portion 82 which defines a region of increasing aperture in a direction extending away from narrowed portion 83 as shown in FIGS. 17. It will further be appreciated that the dimensions of orifice 81 relative to the dimensions of the apertures 112b may be varied.

The total area of "Y" notch orifice 81 is substantially the same as the area of outlet 50. For example, if the area of "Y" notch orifice 81 were substantially smaller than that of outlet 50, the fluid flow out of apparatus 100b would be restricted. There would be no added value to making the area of the "Y" notch orifice substantially greater than that of outlet 50 as the area of outlet 50 determines the rate of fluid flow through apparatus 100b.

The purpose of the Y notch orifice 81 or any other shaped orifice is to regulate the flow going out through outfall pipe 60 so that when the flow into the housing 100b exceeds that of the flow out through outfall pipe 60, the float is induced to rise, thereby allowing more flow into housing 100b through screen 110b. The greater the flow into the housing 100b, the further the float is lifted until the maximum flow through "Y" notch orifice 81 is achieved (within the constraints of the dimensions of the outflow pipe 60). Furthermore, if the apertures 112b in screen 110b become blocked then the "Y" notch orifice 81 allows the housing 100b to empty of liquid through outfall pipe 60, thus resulting in the lowering of the float 130b until rods 124b extend through apertures 112b in screen 110b, thereby cleaning any obstructing rag from the screen 110b. This cycle will then repeat itself as liquid flows into housing 100b again lifting the float 130b. This results in the screen being kept clean of rag.

When float 13b is in its lowest position with respect to seat 101 (see FIG. 14), if the flow rate of effluent 140 through narrow portion 83 of "Y" orifice 81 is less than the flow rate of effluent 140 through screen 110b the level of effluent 140 in housing 20 and therefore in screen cleaning device 100b rises and float 130b lifts off seat 101 pulling rods 124b through apertures 112b in screen 110b. As each rod head 122 passes through respective aperture 112b the aperture will be substantially closed, preventing flow of effluent 140 through aperture 112b. However, because rods 124b comprise two different lengths, only fifty percent of apertures 112b will be obstructed by rod heads 122 at the same time. The apertures 112b and "Y" orifice 81 are dimensioned such that when the float is at a height such that fifty percent of the apertures 112b are substantially blocked by rod heads 122 and fifty percent of apertures 112b are partially blocked by rod stems 121 the flow of effluent 140 through screen 110b required to raise float 130b is permitted. It will be appreciated that a greater variety of lengths of rods 124b could be used to further reduce the restriction of flow of effluent 140 through apertures 112b due to obstruction of apertures 112b by rod heads 122.

Rods 124b may be discreet components coupled to float 130b. Alternatively, the plurality of rods 124b may be mounted on a body to form a rake member which is, in turn, mounted on the float 130b. Alternatively rods 124b may be formed integrally with float 130b.

As the level of effluent 140 rises, float 130b rises and increased area of "Y" notch orifice 81 is exposed allowing a greater flow of effluent 140 through "Y" notch orifice 81 and through outfall outlet 50.

Figure 18:
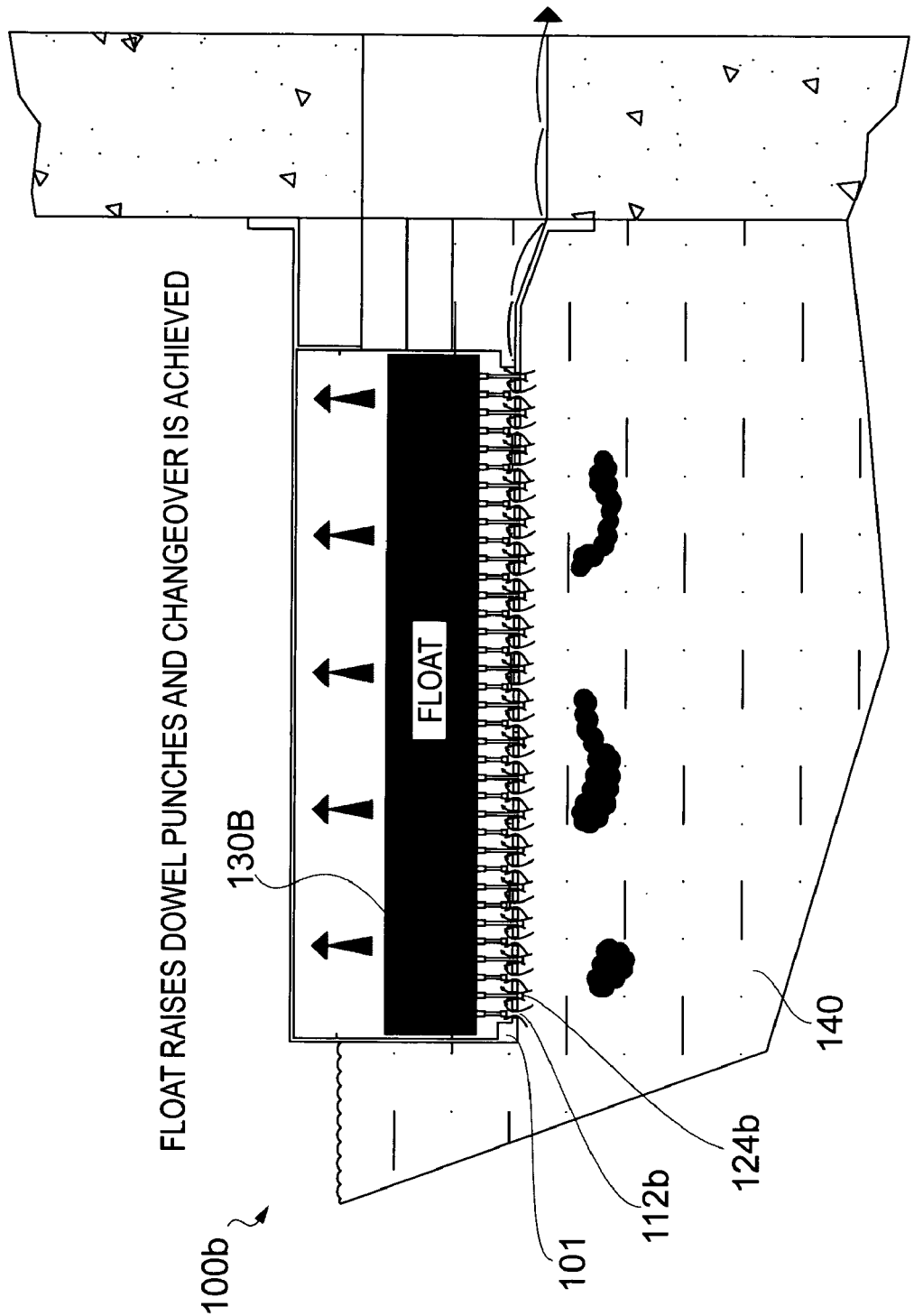
FIG. 18 is a cross-sectional view of the embodiment of FIG. 14 in a semi-open position with the float partially raised.

In FIG. 18 the level of effluent 140 has risen to lift float 130b away from seat 101. The shorter rods 124b have been completely removed from their respective apertures 112b which are now substantially free from obstruction. The flow rate of effluent 140 through screen 110b is therefore increased. If a nett inflow of effluent 140 to screen cleaning device 100b continues the level of effluent 140 and float 130b will continue to rise until the fully open position shown in FIG. 9 is achieved, i.e. the float 130b has reached its highest position within housing 20.

Figure 19:
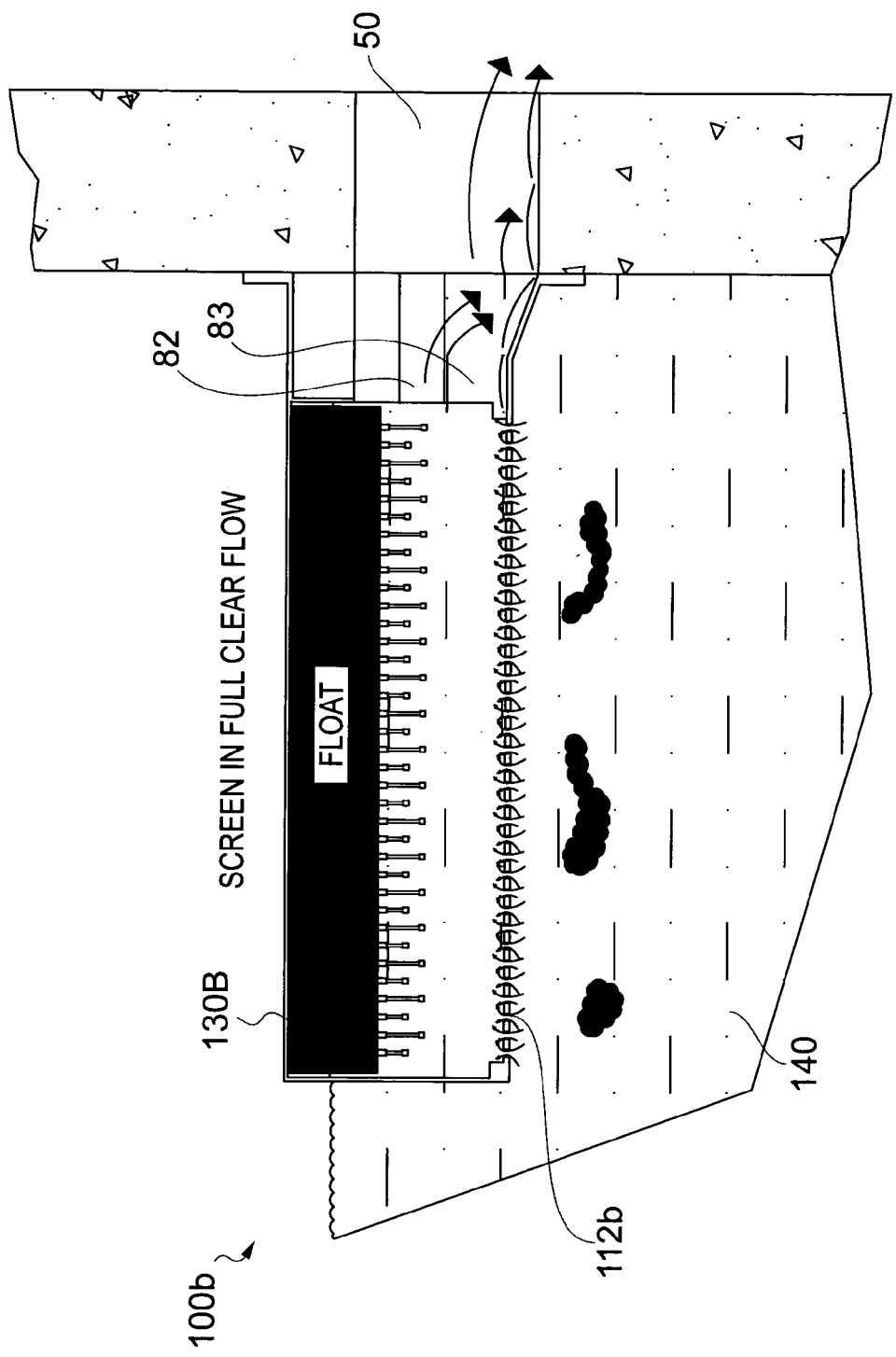
FIG. 19 is a cross-sectional view of the embodiment of FIG. 14 in a fully open position with the float in its highest position.

FIG. 19 shows the screen cleaning device in the fully open position. In this position apertures 112b and "Y" orifice 81 are substantially free of obstruction. The dimensions of "Y" orifice 81 are such that the flow rate through "Y" notch orifice 81 is sufficient to meet the overflow requirements of pumping station 10.

Figure 20:
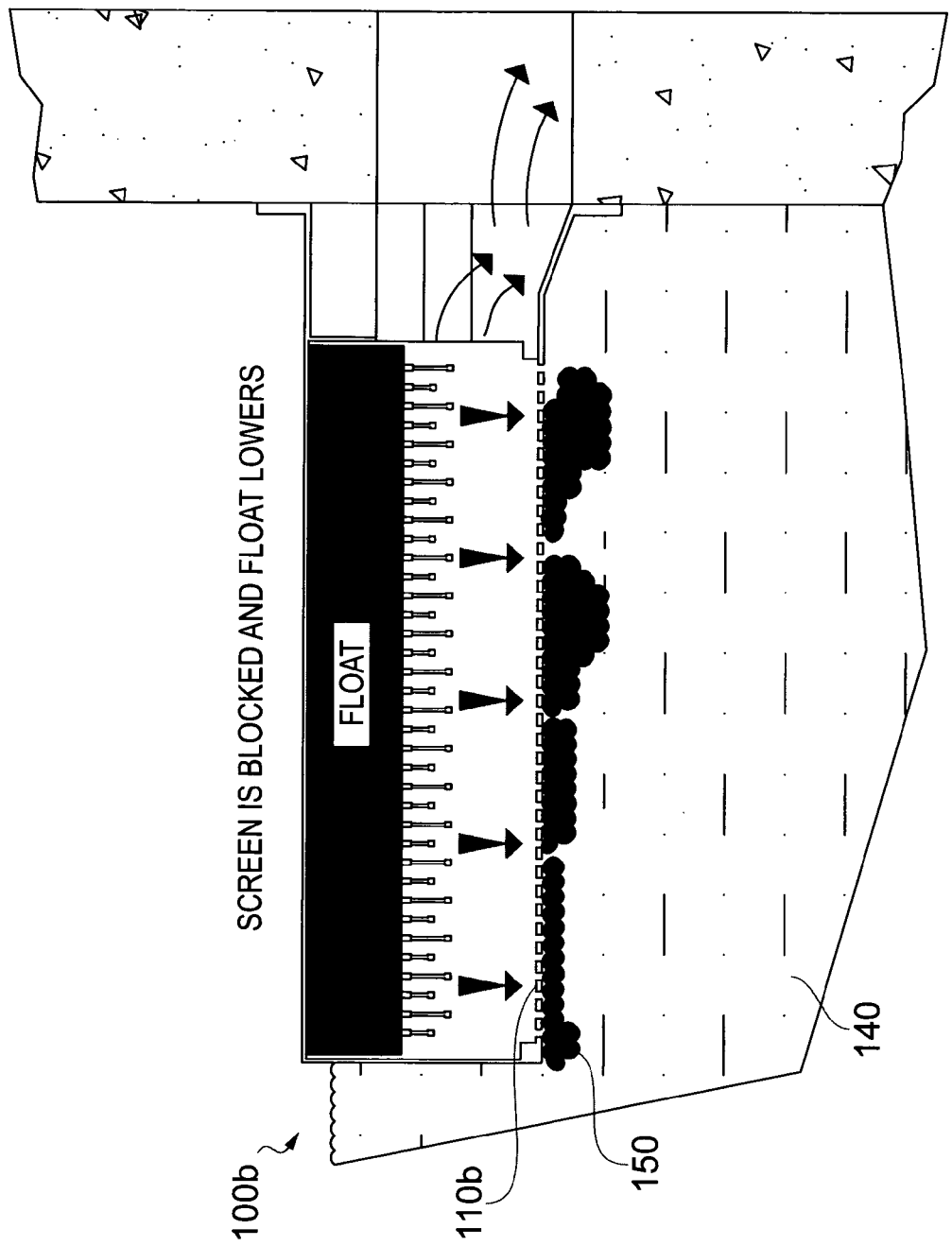
FIG. 20 is a cross-sectional view of the embodiment of FIG. 14 with the screen blocked and the float/rake descending to clean the screen.

FIG. 20 shows the screen cleaning device 100b in the fully open position with the screen 110b blocked by rag 150. This may be caused by the flow of effluent 140 through screen 110b causing pieces of rag 150 to become lodged in apertures 112b.

If apertures 112b become partially or completely blocked the flow of effluent 140 through screen 110b will be restricted. If, as a result of complete or partial blockage of apertures 112b, the flow of effluent 140 into the screen cleaning device 100b becomes less than the flow of effluent 140 out of the screen cleaning device 100b, via "Y" orifice 81, the level of effluent 140 in the screen cleaning device 100b will fall, as will float 130b. As the float 130b moves closer to the screen 110b the aligned rods 124b to pass through the apertures 112b in screen 110b dislodging any obstruction therein. The weight of the float is sufficient to dislodge any obstruction. As rods 124b extend below screen 110b rag 150 trapped against the underside of screen 110b is pushed away form the surface of screen 110b. The dislodged rag will be swept away from the screen by the turbulence of the effluent and return to float in the wet well. At the normal operating range the pumps may draw the rag in under suction and pass it forward. Otherwise, the rag will be removed by tanker during the scheduled well clean.

As a result of removing rag 150 from screen 110b the flow rate of effluent 140 through screen 110b will increase. If the flow rate of effluent 140 through screen 110b again exceeds the flow rate of effluent 140 through "Y" orifice 81, now partially obstructed by float 130b, the level of effluent 140 inside screen cleaning device 100b will again rise as will float 130b, again removing rods 124b from apertures 112b. The transitioning between open and closed positions will repeat as necessary as long as an overflow situation exists.

Screen 110b, rods 124b and "Y" notch orifice plate 80 comprise materials such as but not limited to stainless steel, which will suffer substantially no deterioration when placed in contact with effluent for prolonged periods of time.

Although aspects of the invention have been described with reference to the embodiments shown in the accompanying drawings, it is to be understood that the invention is not limited to the precise embodiments shown and that various changes and modifications may be effected without further inventive skill and effort. For example, it will be appreciated that an automatic screen cleaning member in accordance with the present invention also has application in other environments, for example, in brewing or any other filtration systems in which it is desired to keep screens free from blockages.

The invention claimed is:

1. An automatic screen cleaning apparatus comprising:
  a. a housing for containing a liquid, the housing provided with a liquid inlet, a liquid outlet and a screen member;
  b. the screen member defining at least one aperture therethrough;
  c. an orifice plate defining an orifice in fluid communication with the liquid outlet of the housing; and
  d. a float member received within the housing, the float member comprising a rake member having one or more protrusions, the or each protrusion aligned with a respective aperture defined by the screen member,
  wherein the float member is moveable relative to the screen member in dependence upon variations in the volume of liquid received within the housing such that the float member obstructs the orifice of the orifice member to varying amounts in dependence upon the position of the float member within the housing.

2. An automatic screen cleaning apparatus comprising:
  a. a housing for containing a liquid, the housing provided with a liquid inlet, a liquid outlet and a screen member;
  b. the screen member defining at least one aperture therethrough;
  c. a rake member received within the housing and having one or more protrusions, the or each protrusion extending into a respective aperture defined by the screen member;
  d. a float member adapted to apply a force to the rake member such that the rake member is moveable relative to the screen member in dependence upon variations in the volume of liquid received within the housing.

3. The automatic screen cleaning apparatus according to claim 1, wherein the orifice of the orifice plate comprises a "Y" shaped aperture.

4. The automatic screen cleaning apparatus according to claim 3, wherein the screen member comprises a plurality of elongate spacers each pair of elongate spacers defining a gap therebetween.

5. The automatic screen cleaning apparatus according to claim 3, wherein the screen member comprises a substantially planar member defining a plurality of apertures therethrough.

6. The automatic screen cleaning apparatus according to claim 3 comprising a resilient member adapted to apply a force on the rake member that is counter to the force applied on the rake member by the float.

7. The automatic screen cleaning apparatus of claim 6 wherein the resilient member comprises a spring.

8. The automatic screen cleaning apparatus according to claim 3, wherein at least a portion of the or each protrusion is dimensioned to correspond substantially with a dimension of the respective aperture through which it extends.

9. The automatic screen cleaning apparatus according to claim 3, wherein movement of the rake member relative to the screen member results in relative movement of the or each protrusion relative to the respective aperture through which it extends.

10. The automatic screen cleaning apparatus according to claim 3 comprising a plurality of rake members.

11. The automatic screen cleaning apparatus according to claim 3, wherein the rake member is integral with the float member.

12. The automatic screen cleaning apparatus of claim 3 wherein the apparatus is positioned within a sewage pumping station, the pumping station having a sewage outfall pipe, and the outlet of the housing of apparatus communicates with an inlet of the outfall pipe.

13. A method of cleaning a screen comprising:
  a. providing a screen cleaning apparatus including a housing, a screen, a rake and a float the housing containing a fluid and including a fluid inlet and a fluid outlet, the screen being positioned in the housing and defining one or more apertures, the rake also being positioned in the housing and having one or more protrusions, each protrusion extending into a respective aperture in the screen, and the float applying a force to the rake moving the rake relative to the screen and in dependence upon variations of a volume of fluid received in the housing; and
  b. passing fluid through the inlet in the housing so as to vary the volume of fluid received within the housing.

14. The method of claim 13 wherein the screen cleaning apparatus further comprises a resilient member applying a force on the rake member counter to the force applied on the rake member by the float.

15. The method of claim 14 wherein the force applied to the by the float is greater than the force applied to the rake by the resilient member.

16. The method of claim 14 wherein the rake member remains at a surface of the fluid in the housing due to a balance of forces acting at rake by the float and the resilient member.

17. The method of claim 13 further comprising providing a sewage pumping station having a sewage outfall pipe, and the outlet of the housing of the screen cleaning apparatus communicating with an inlet of the outfall pipe.

18. A rake member for automatic cleaning of a screen of a pumping station, the rake member comprising one or more protrusions, the or each protrusion adapted to extend into an aperture within the screen, a resilient member located at a first surface of the rake member and a float member located so as to apply a second opposing force to the rake member.

19. A rake member according to claim 18, wherein the float member is located substantially adjacent the rake member.

\* \* \* \* \*

UNITED STATES PATENT AND TRADEMARK OFFICE
CERTIFICATE OF CORRECTION

| | | |
|---|---|---|
| PATENT NO. | : 8,038,889 B2 | Page 1 of 1 |
| APPLICATION NO. | : 12/528892 | |
| DATED | : October 18, 2011 | |
| INVENTOR(S) | : Samuel Munn | |

It is certified that error appears in the above-identified patent and that said Letters Patent is hereby corrected as shown below:

Title Page:

Item (57) Abstract: At line 13, delete "will", insert --with--.

In the Specification:

At column 1, line number 20, after into insert --.--.
At column 1, line number 38, delete "outfall'", insert --outfall--.
At column 2, line number 23, delete ".".
At column 2, line number 42, delete "and", insert --any--.
At column 4, line number 63, after view of the screen, delete "of the screen".
At column 5, line number 30, delete "with", insert --the--.
At column 6, line number 1, delete "moves".
At column 7, line number 26, after order, insert --to--.
At column 8, line number 10, delete "13b", insert --130b--.
At column 8, line number 43, delete "nett", insert --net--.
At column 8, line number 66, delete "to".
At column 9, line number 21, after effluent, insert --140--.

In the Claims:

At column 10, line number 47, delete "by the float", insert --rake--.

Signed and Sealed this
Twenty-fifth Day of September, 2012

David J. Kappos
*Director of the United States Patent and Trademark Office*